United States Patent
Herrmann

(10) Patent No.: US 8,640,989 B2
(45) Date of Patent: Feb. 4, 2014

(54) SPEED BRAKE FOR AIRCRAFT

(75) Inventor: Otfrid Herrmann, Denzlingen (DE)

(73) Assignee: EADS Deutschland GmbH, Ottobrunn (DE)

( * ) Notice: Subject to any disclaimer, the term of this patent is extended or adjusted under 35 U.S.C. 154(b) by 177 days.

(21) Appl. No.: 13/060,927

(22) PCT Filed: Aug. 26, 2009

(86) PCT No.: PCT/DE2009/001196
§ 371 (c)(1),
(2), (4) Date: May 13, 2011

(87) PCT Pub. No.: WO2010/022710
PCT Pub. Date: Mar. 4, 2010

(65) Prior Publication Data
US 2011/0215197 A1    Sep. 8, 2011

(30) Foreign Application Priority Data
Aug. 28, 2008 (DE) .......................... 10 2008 044 677

(51) Int. Cl.
*B64C 9/32* (2006.01)
*B64D 17/80* (2006.01)

(52) U.S. Cl.
USPC .......................................... 244/113; 244/213

(58) Field of Classification Search
USPC ........... 244/110 A, 113, 213–215, 200, 200.1
See application file for complete search history.

(56) References Cited

U.S. PATENT DOCUMENTS

| 3,067,971 | A | * | 12/1962 | Dew | 244/113 |
| 3,184,186 | A |   | 5/1965 | Ikai et al. | |
| 3,743,219 | A | * | 7/1973 | Gorges | 244/210 |
| 4,427,168 | A | * | 1/1984 | McKinney et al. | 244/214 |
| 4,553,721 | A | * | 11/1985 | Jorgensen | 244/213 |
| 4,717,097 | A | * | 1/1988 | Sepstrup | 244/217 |
| 5,681,013 | A | * | 10/1997 | Rudolph | 244/214 |
| 6,299,109 | B1 |  | 10/2001 | Stephan et al. | |
| 6,863,245 | B2 | * | 3/2005 | Gessler et al. | 244/215 |
| 6,981,676 | B2 | * | 1/2006 | Milliere | 244/213 |
| 7,578,484 | B2 | * | 8/2009 | Fox et al. | 244/214 |
| 7,946,535 | B2 | * | 5/2011 | Chase et al. | 244/215 |

(Continued)

FOREIGN PATENT DOCUMENTS

| DE | 658 470 | | 10/1935 |
| DE | 2 215 032 | A | 10/1973 |
| EP | 1 008 515 | A2 | 6/2000 |
| GB | 2 051 706 | A | 1/1981 |

OTHER PUBLICATIONS

C. Breitsamter, "Airbrake Induced Fin Buffet Loads on Fighter Aircraft" ICAS, 25$^{TH}$ International Congress of the Aeronautical Science, Jan. 1, 2006, XP009112042.

(Continued)

*Primary Examiner* — Philip J Bonzell
(74) *Attorney, Agent, or Firm* — Crowell & Moring LLP

(57) ABSTRACT

A speed brake for aircraft in the form of a flap is provided. The flap can be extended into the air stream for increasing the flow resistance of the air. An extension is attached on the upper side of the flap on one side with respect to the center line of the flap, and the extension is attached in such a manner that in the retracted state of the flap, the extension extends along the flow direction of the air.

6 Claims, 4 Drawing Sheets

(56) References Cited

U.S. PATENT DOCUMENTS

Figure 6:
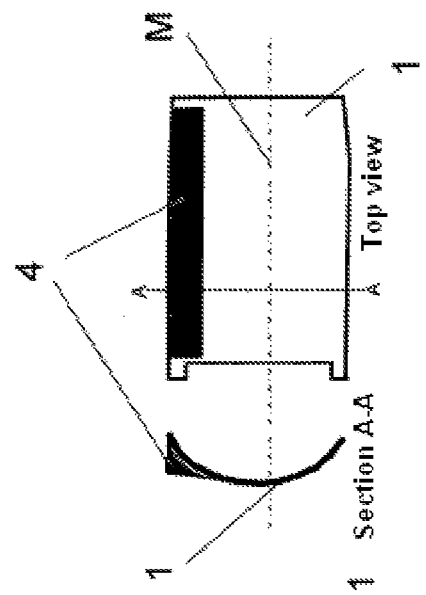

2003/0102410 A1* 6/2003 Gessler et al. ................ 244/215
2005/0061922 A1* 3/2005 Milliere ....................... 244/213

OTHER PUBLICATIONS

International Search Report including partial English translation dated Jul. 29, 2010 and PCT/ISA/237 Form (Fifteen (15) pages).

* cited by examiner

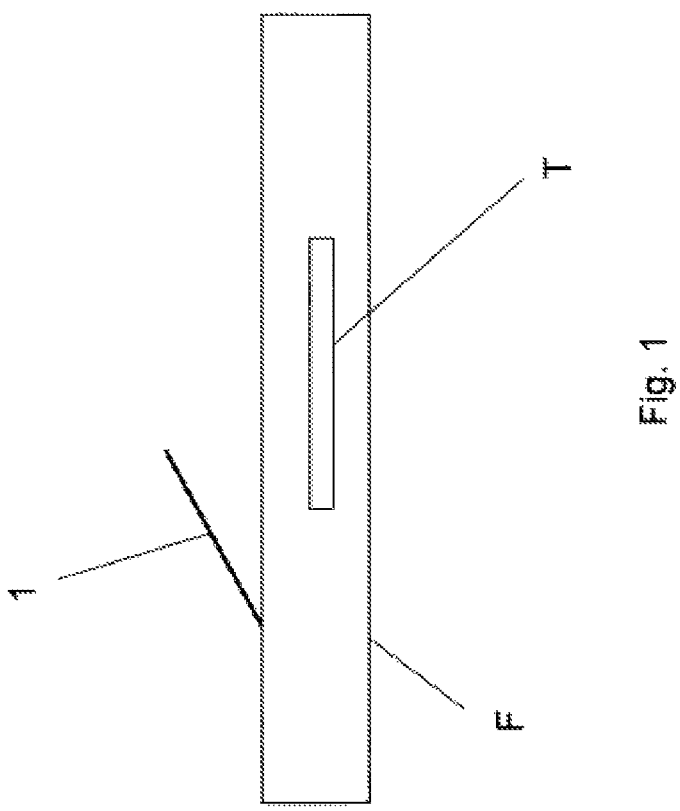

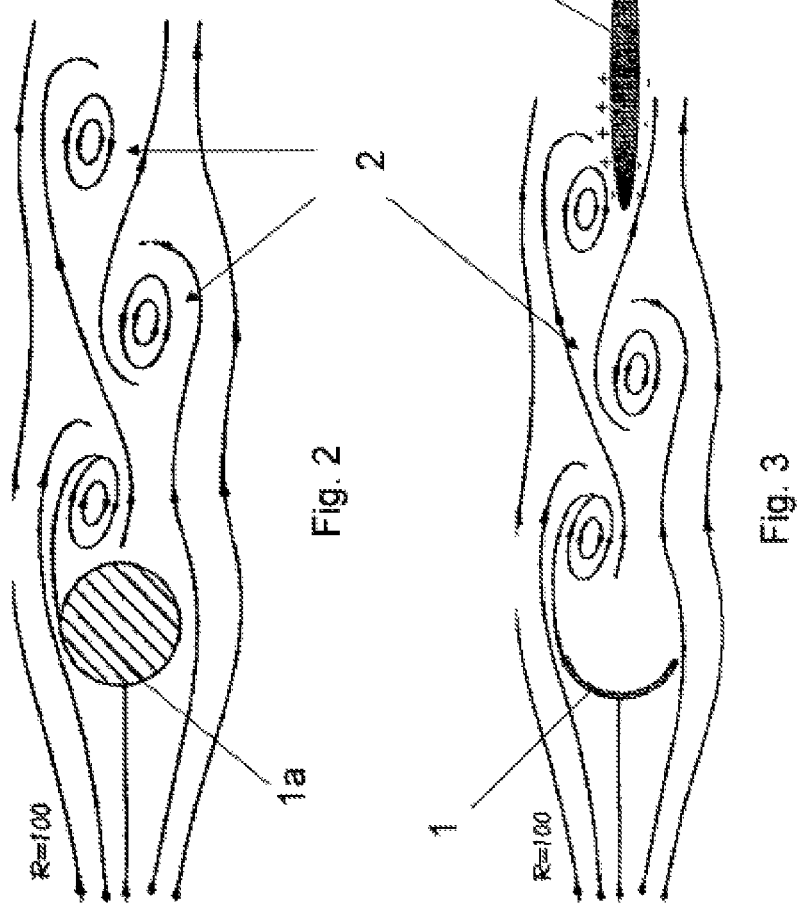

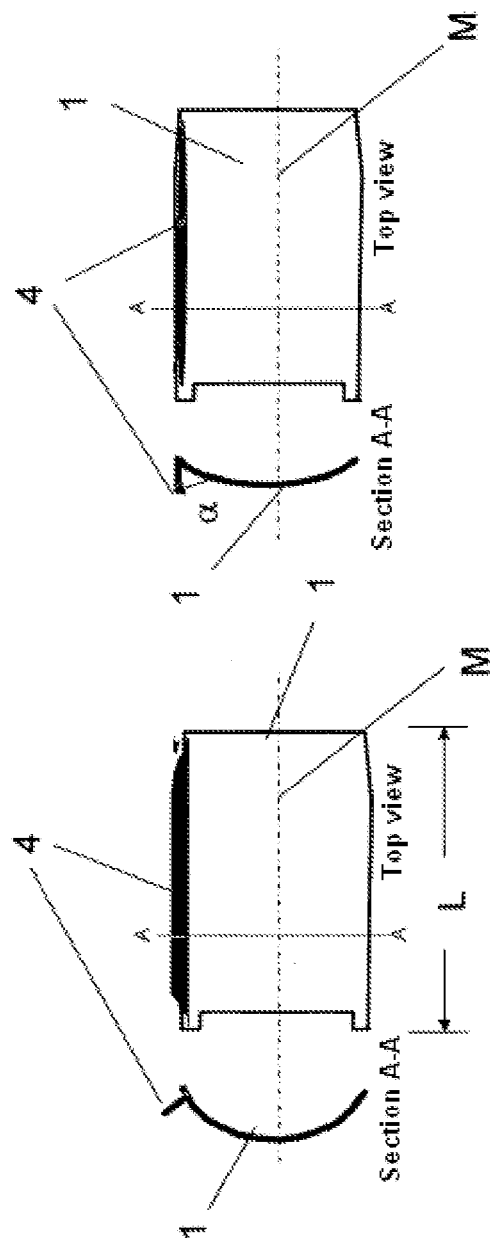

SPEED BRAKE FOR AIRCRAFT

CROSS-REFERENCE TO RELATED APPLICATIONS

This application is a national stage of PCT Application No. DE2009/001196, filed Aug. 26, 2009, and claims priority under 35 U.S.C. §119 to German Patent Application No. 10 2008 044 677.7, filed Aug. 28, 2008, the entire disclosures of these documents are herein expressly incorporated by reference.

BACKGROUND AND SUMMARY OF THE INVENTION

The invention relates to a speed brake for aircrafts according to the preamble of the patent claim 1.

A speed brake is a flap on a vehicle which flap can be extended into the air stream and which increases the flow resistance of the air and thus serves as brake. The resistance increase caused by a speed brake can take place by increasing the front area or by increasing the drag coefficient $c_d$. Hereby, the induced drag is increased. Since downstream of the speed brakes, the laminar flow stalls at the airfoil, in addition, the lift decreases.

Speed brakes are used for aircrafts to reduce the airspeed (at a higher angle of attack), to increase the rate of descent or to reduce the landing run during landing. In case of military aircrafts, the speed brake is also used for tactical maneuvers (e.g. Cobra maneuver) or to reduce the speed during a nose-dive (dive brake).

The brake flaps of aircrafts are extended mechanically or hydraulically from the upper or lower side of the airfoils but also from both sides. Also, in case of combat aircraft, brake flaps are used that extend from the bottom of the fuselage or the side walls of the fuselage. In most cases, the flap itself is curved and adapted to the fuselage contour. FIG. 1 schematically illustrates a military aircraft F in a side view. In the region of the airfoil T there is a speed brake in the form of an extendable flap 1.

In the retracted state, the flap 1 adapts to the outer contour of the aircraft F.

One problem is that downstream of the flap, strong air vortices develop which are also known as Karman vortex street (FIG. 2). Downstream of the cylinder 1a, which lies transverse to the flow, the oppositely rotating vortices 2 are shown which depart alternately from the one side and the other side of the body 1a. The flow downstream of the speed brake 1 behaves similarly as schematically illustrated in FIG. 3.

These vortices 2 result in pressure fluctuations (pressure vibrations) which can cause not only the speed brake itself to vibrate but also, in particular, the areas of the aircraft downstream of the speed brake and can significantly reduce the durability of the same or can even destroy them within a short time if the narrowband vibration gets into resonance with the component. FIG. 3 illustrates schematically in picture 3 the alternating pressurization on a vertical stabilizer arranged downstream of the speed brake 1.

Exemplary embodiments of the present invention provide a generic speed brake that can reduce or prevent such pressure fluctuations.

The speed brake according to the invention for aircraft is in the form of a flap that is extendible into the air flow for increasing the flow resistance of the air and is characterized in that an extension is attached on the upper side of the flap on one side with respect to the center line of the flap in such a manner that the extension extends in the retracted state of the flap along the flow direction of the air.

In the extended state, the extension according to the invention changes the outflow of the vortices on one side and thus prevents the symmetrical and alternating departure of equally large vortices. This reduces the amplitude of the pressure fluctuations downstream of the flap and reduces the risk of resonance.

Thus, the fundamental idea of the invention is to modify the flap on its side facing the flow in such a manner that the air flow no longer runs symmetrically over the flap as this is the case in the prior art, but asymmetrically, whereby the desired effect of a symmetrical departure of vortices downstream of the flap is achieved.

The negative effect of the speed brake known from the prior art is reduced with the invention so that the durability of aircraft components arranged downstream thereof is improved and the speed brake can be deflected at a greater angle to the flow. By the extension according to the invention, neither the aircraft performance nor the strength of the speed brake is influenced.

BRIEF DESCRIPTION OF THE DRAWING FIGURES

Figure 7:
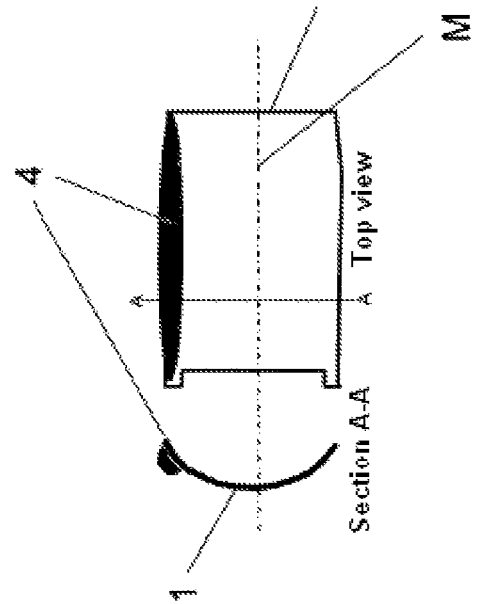

The invention and advantageous embodiments are illustrated in more detail by means of figures. In the figures:

FIG. 1 shows a schematic illustration of an aircraft with speed brake in a side view, FIG. 2 shows a schematic illustration of the vortex formation of a flow downstream of a cylinder, FIG. 3 shows a schematic illustration of the vortex formation of a flow downstream of a speed brake, FIG. 4 shows a first embodiment of a speed brake according to the invention, FIG. 5 shows a second embodiment of a speed brake according to the invention FIG. 6 shows a third embodiment of a speed brake according to the invention, FIG. 7 shows a fourth embodiment of a speed brake according to the invention.

DETAILED DESCRIPTION OF THE DRAWING FIGURES

FIG. 4 shows a first embodiment of a speed brake according to the invention. The illustration shows on the right side a speed brake 1 in a top view and on the left side the speed brake 1 in the sectional view A-A. On the upper side of the speed brake 1, the extension 4 according to the invention is arranged single-sided with respect to the center line M. In this embodiment, the extension 4 is a web which can also be designated as rib or fence. The extension 4 can extend over the entire length L of the speed brake 1. Furthermore, the extension 4 can be formed in a continuous manner or can have interruptions. In FIG. 4, the extension 4 is arranged parallel to the surface normal on the speed brake.

In FIG. 5, in a second embodiment of a speed brake according to the invention, the extension 4 is arranged at an angle α to the surface of the speed brake 1, wherein a is smaller than 90°.

In FIG. 6, in a third embodiment of a speed brake according to the invention, the extension 4 is formed as elongate bead.

In FIG. 7, in a fourth embodiment of a speed brake according to the invention, the extension 4 is configured as thickness increase of the profile of the speed brake and is formed on one side with respect to the center line M. Thereby, an asymmetrical shape is embossed onto the profile of the speed brake 1, whereby the air flow can no longer flow symmetrically around the speed brake 1 which results in the fact that counter-rotating vortices cannot form downstream of the speed brake 1 as shown in FIGS. 2 and 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A speed brake for aircraft, the speed brake being a flap extendable into an air stream to increasing the flow resistance of the air, wherein an extension is attached on an upper side of the flap on only one side with respect to a center line of the flap, and the extension is attached in such a manner that in a retracted state of the flap the extension extends along the flow direction of the air, and wherein the extension is fixedly attached to the flap so that it cannot move independently of the flap, wherein the flap is curved, and the extension extends over an entire length of the speed brake.

2. The speed brake according to claim 1, wherein the extension is a longitudinal web or an elongate bead.

3. The speed brake according to claim 1, wherein the extension represents a thickness increase of a profile of the flap.

4. The speed brake according to claim 1, wherein the speed brake has only one extension on the upper side of the flap.

5. The speed brake according to claim 1, wherein the extension is arranged parallel to a surface normal on the speed brake.

6. The speed brake according to claim 1, wherein the extension is arranged at an angle smaller than 90° to the upper side of the flap.

* * * * *